United States Patent Office 3,155,738
Patented Nov. 3, 1964

3,155,738
SEPARATION OF DIMETHYLNAPHTHALENES
George Suld, Springfield, Pa., assignor to Sun Oil Company, Philadelphia, Pa., a corporation of New Jersey
No Drawing. Filed Sept. 20, 1962, Ser. No. 225,112
10 Claims. (Cl. 260—674)

This invention relates to a method of separating 2,7-dimethylnaphthalene from mixtures of dimethylnaphthalene isomers which contain at least 2,6-dimethylnaphthalene and 2,7-dimethylnaphthalene. The method is particularly suitable for separating 2,7-dimethylnaphthalene from binary mixtures of 2,6-dimethylnaphthalene and 2,7-dimethylnaphthalene.

2,6-naphthalenedicarboxylic acid is a highly desirable article of commerce, particularly in that it can be used to prepare polyester type resins which have outstandingly good properties for certain applications. This dicarboxylic acid can be obtained by liquid phase oxidation of 2,6-dimethylnaphthalene in several ways. One known procedure involves the use of molecular oxygen (e.g., air) at temperatures in the range of 100°–250° C. while utilizing a catalyst system comprising a heavy metal oxidation catalyst and bromine or a bromine compound. This type of oxidation process has been described in Saffer et al., U.S. Patent 2,833,816.

For commercial practice a difficulty in producing 2,6-naphthalenedicarboxylic acid lies in finding a suitable source of the 2,6-dimethylnaphthalene isomer. This compound occurs in coal tar and cracked petroleum fractions of appropriate boiling range but only in low proportion since it is associated with the various other dimethylnaphthalene isomers, monocyclic aromatics, and non-aromatic hydrocarbons. A concentrate of the dimethylnaphthalene isomers can be obtained by solvent extraction of the fraction with an aromatic selective solvent such as furfural, but the 2,6-isomer is still a relatively small proportion of the concentrate. Attempts to isomerize the other isomers, particularly those in which both methyl groups are positioned on the same ring, have not been successful.

In a copending application (Serial No. 216,027, filed August 10, 1962), a method has been disclosed by which a mixture of the ten dimethyldecalin position isomers can be prepared. From this mixture a mixture of 2,6- and 2,7-dimethyldecalin can be isolated and subsequently dehydrogenated to a mixture of 2,6- and 2,7-dimethylnaphthalene. A method has now been found by which the 2,1-dimethylnaphthalene in such a mixture can be separated. The method comprises contacting the mixture of 2,6- and 2,7-dimethylnaphthalene, dissolved in a solvent, with hydrogen fluoride (HF) and boron trifluoride ($BF_3$). An acid phase containing mainly HF, $BF_3$, and 2,7-dimethylnaphthalene is then separated from a hydrocarbon phase containing mainly 2,6-dimethylnaphthalene and solvent. The HF, $BF_3$, and solvent are then separated from their respective phases by simple distillation and can be subsequently reused.

The invention can also be used to prepare separate 2,7-dimethylnaphthalene from a mixture containing not only 2,6- and 2,7-dimethylnaphthalene, but also any of the various other dimethylnaphthalene isomers. In this aspect the invention provides a method for the preparation of 2,6-DMN concentrates. Such a mixture can, as described hereinbefore, be obtained from appropriate coal tar and petroleum fractions but is preferably obtained by dehydrogenation of a mixture of dimethyldecalin isomers, the latter mixture being prepared as disclosed in the aforesaid copending application.

The invention will be described in detail with reference to a binary mixture of 2,6-dimethylnaphthalene and 2,7-dimethylnaphthalene. In the remainder of this specification, dimethylnaphthalene and dimethyldecalin will be sometimes referred to as DMN and DMD respectively.

The aforesaid copending application discloses a method for the preparation of a binary mixture of 2,6- and 2,7-DMD. Such a DMD mixture can then be dehydrogenated to a mixture of 2,6- and 2,7-DMN. As described therein, any dicyclic naphthene containing 12 carbon atoms is, upon contact with an $AlBr_3$—HBr or an $AlCl_3$—HCl catalyst at a temperature in the range of $-10°$ to $60°$ C., isomerized to an equilibrium mixture of DMD isomers in which 2,6-DMD occurs in relatively high proportion, e.g., 25–40%. If the catalyst is $AlCl_3$—HCl, the catalyst activity is maximized by maintaining the reaction zone under a high, e.g., 100–500 p.s.i. HCl partial pressure. If the catalyst is $AlBr_3$—HBr high catalyst activity is maintained with only a slight HBr partial pressure. With either the $AlBr_3$—HBr or the $AlCl_3$—HCl catalyst, the isomerization is desirably carried out in the presence of a solvent which is preferably a monocyclic naphthene containing 7–9 carbon atoms.

A portion of the 2,6-DMD in the equilibrium mixture can be separated essentially pure by fractional crystallization at a low temperature, e.g., $-80°$ C. to $-100°$ C. where a $C_7$–$C_9$ naphthene solvent was used, $-10°$ C. to $-70°$ C. when no such solvent was used. The yield of 2,6-DMD precipitate increases as the temperature decreases. However, as the temperature is lowered, a point is reached, prior to the precipitation of all the 2,6-DMD in the equilibrium mixture, at which 2,7-DMD also precipitates. Thus in order to maximize the recovery of 2,6-DMD in this fractional crystallization step, it is necessary to recover at least some of the 2,6-DMD in admixture with 2,7-DMD. Such an admixture will result, upon dehydrogenation, in 2,6-DMN admixed with 2,7-DMN.

According to the present invention, separation of 2,6-DMN from a 2,6-DMN-2,7-DMN mixture is effected by contacting the mixture, dissolved in a solvent, with HF and $BF_3$. Upon such contact two phases result. One phase, hereinafter referred to as the hydrocarbon phase, is relatively rich in 2,6-DMN (based on DMN's), contains essentially all of the solvent and may also contain a small amount of 2,7-DMN and trace amounts of HF and $BF_3$. The second phase, hereinafter referred to as the acid phase, is relatively rich in 2,7-DMN (based on DMN's), contains essentially all of the HF and $BF_3$, and may also contain a small amount of 2,6-DMN and trace amounts of solvent. As explained hereinafter, the 2,6-DMN and 2,7-DMN in the acid phase are complexed with the HF and $BF_3$. The amount of 2,6-DMN and 2,7-DMN in the hydrocarbon phase will vary depending upon such conditions as the composition of the charge mixture but in any event the ratio of 2,6-DMN to 2,7-DMN will be higher in the hydrocarbon phase than in the charge mixture. Because of this higher ratio of 2,6-DMN to 2,7-DMN in the hydrocarbon phase, said hydrocarbon phase is a concentrate of 2,6-DMN. The two phases are next separated by, for example, decanting. Any HF, $BF_3$, and/or solvent present in either phase is then separated from the DMN in such phase by, for example, distillation at, say, 100° C.

The temperature at which the charge mixture is contacted with HF and $BF_3$ should be in the range of $-10°$ C. to 50° C., preferably 0° C. to 35° C. Within these ranges, lower temperatures are desirable in order to minimize any isomerization side reactions. Since within these specified temperature ranges 2,6- and 2,7-DMN are solids, the 2,6-DMN-2,7-DMN charge mixture is preferably dissolved in a solvent when contacted with the HF and $BF_3$. Examples of suitable DMN solvents are benzene, toluene, hexane, cyclohexane, heptane, and the like. Oxygen containing solvents such as alcohols and ethers and highly basic aromatic solvents such as xylene should be avoided because these solvents tend to form complexes with HF and $BF_3$.

The amount of HF and $BF_3$ required to effect separation is best explained with reference to the following discussion of what is believed to be the mechanism of the separation process of the invention. In the presence of $BF_3$ and excess HF, both 2,6-DMN and 2,7-DMN form complexes which can be indicated as 2,6-DMN·$H^+BF_4^-$ and 2,7-DMN·$H^+BF_4^-$ respectively. The 2,7-DMN isomer is more basic than the 2,6-DMN isomer and complexes preferentially with the acidic HF-$BF_3$ system, hence if a mixture of 2,6-DMN and 2,7-DMN is mixed with a limited amount of $BF_3$ and excess HF, this difference in basicity will effect a separation. In practicing the invention the HF should be used in molar excess of the total moles of DMN in the charge material. Preferably the molar ratio of HF to total DMN's in the charge material is in the range of 5:1 to 75:1. The amount of $BF_3$ used should be less than 1 mole of $BF_3$ per mole of total DMN's in the charge mixture. As $BF_3$ is added to the charge mixture in the presence of excess HF, the 2,6-DMN and 2,7-DMN begin to form complexes and dissolve in the excess HF. Upon initial addition of $BF_3$ the formation of 2,7-DMN complex is favored. However, as additional increments of $BF_3$ are added, the amounts of each complex formed tend to equalize and eventually more 2,6-DMN is complexing and dissolving in the HF than 2,7-DMN. Finally when one mole of $BF_3$ per mole of DMN in the charge mixture has been added, all the DMN's in the charge mixture are complexed and dissolved in the HF. Any amount of $BF_3$ less than one mole per mole of total DMN's in the charge mixture will effect a separation. Generally, however, the mole ratio of $BF_3$ to total DMN's in the charge mixture will be in the range of 0.05:1 and 0.7:1. The ratio should not be equal to or higher than 1:1 because this merely results in a transfer in toto of all the DMN's in the charge mixture to the acid phase with no separation at all.

The separation can be carried out in conventional equipment and can be a batch or continuous process. Likewise, single or successive separations, i.e. single stage or multi-stage separation, can be employed. Successive separations are desirable as they result in higher ratios of 2,6-DMN to 2,7-DMN in the hydrocarbon phase. By way of example, a single stage batch type separation is conveniently effected by charging the solvent to a reactor maintained within the previously specified temperature limits. The 2,6-DMN-2,7-DMN mixture is then charged to the reactor and the contents agitated. The HF is then added following which the $BF_3$ is added. Since $BF_3$ is a gas at the specified temperatures, it is conveniently added through a pipe which extends below the level of the reactor contents. After the entire contents of the reactor have been agitated for a few minutes, the agitator is shut off and the two phases allowed to separate. The hydrocarbon phase, a concentrate of 2,6-DMN, is lighter than the acid phase and is readily removed by decanting.

It will usually be desirable to remove any HF, $BF_3$, and/or solvent from each phase in order to recover the DMN's and in order to reuse the HF, $BF_3$, and solvent. Substantially all the HF and $BF_3$ are in the acid phase although trace amounts of either may be present in the hydrocarbon phase. Likewise, substantially all the solvent is in the hydrocarbon phase although there may be a trace amount in the acid phase. These compounds can be removed from either phase (including the HF and $BF_3$ in the complexes in the acid phase) by simple distillation since HF, $BF_3$, and solvents of the type mentioned hereinbefore all boil well below 250° to 270° C., the boiling point range of the DMN's. Usually distillation at about 100° C. will suffice to remove all the HF, $BF_3$, and/or solvent from either phase, after which they can be condensed separately or together and subsequently reused.

The amount of 2,6-DMN in the hydrocarbon phase is usually 80–100% of the 2,6-DMN in the charge mixture and frequently the recovery is over 95%. As used hereinafter, recovery is the percentage of 2,6-DMN in the charge mixture that is present in the hydrocarbon phase.

The following examples illustrate the invention more specifically. In the examples all percentages are on a weight basis. In all the examples the stated analyses of the hydrocarbon and acid phases are based on total DMN in the phase, i.e., the analysis is exclusive in any HF, $BF_3$, and solvent present.

*Example I*

32 grams of benzene were charged to a shaking type reactor maintained at 28° C. Next 2.5 grams 2,6-DMN and 2.5 grams 2,7-DMN (0.016 mole of each or 0.032 total mole of DMN) were charged to the reactor and dissolved in the benzene. Next 0.95 mole of HF and 0.016 mole $BF_3$ were added to the reactor. The molar ratio of HF to total DMN's thus was 29.7:1, and the molar ratio of $BF_3$ to total DMN's was 0.5:1. The contents of the reactor were shaken for about 3 minutes after which the phases were allowed to separate and the hydrocarbon phase decanted. The hydrocarbon phase analyzed 71% 2,6-DMN and 29% 2,7-DMN. The acid phase analyzed 32% 2,6-DMN and 68% 2,7-DMN. From these figures it can be calculated that the weight ratio of 2,6-DMN to 2,7-DMN in the charge mixture was 1:1 while in the hydrocarbon phase this ratio was 2.4:1. The recovery was 70%.

*Example II*

The procedure was the same as in Example I except that the charge material was 4 grams of 2,6-DMN and 1 gram of 2,7-DMN, and the amount of HF was 1.05 moles. Thus the mole ratio of HF to total DMN's was 32.8:1 and the mole ratio of $BF_3$ to total DMN's was 0.5:1. The acid phase analyzed 73% 2,7-DMN and 27% 2,6-DMN. The hydrocarbon phase analyzed 94% 2,6-DMN and 6% 2,7-DMN. Thus the weight ratio of 2,6-DMN to 2,7-DMN was 4:1 in the charge mixture and 15.7:1 in the hydrocarbon phase. The recovery was 89%.

*Example III*

The procedure was the same as in Example I except that the charge material was 1 gram of 2,6-DMN and 4 grams of 2,7-DMN and the amount of HF was 0.8 mole. Thus the mole ratio of HF to total DMN's was 25:1 and the mole ratio of $BF_3$ to total DMN's was 0.5:1. The acid phase analyzed 86% 2,7-DMN and 14% 2,6-DMN. The hydrocarbon phase analyzed 42% 2,6-DMN and 58% 2,7-DMN. Thus the weight ratio of 2,6-DMN to 2,7-DMN was 0.25:1 in the charge mixture and 0.72:1 in the hydrocarbon phase. The recovery was 98%.

*Example IV*

The procedure was the same as in Example I except that the amount of HF was 1.05 moles and the amount of $BF_3$ was 0.0064 mole. Thus the mole ratio of HF to total DMN's was 21.9:1 and the mole ratio of $BF_3$ to total DMN's was 0.2:1. The acid phase analyzed 22% 2,6-DMN and 78% 2,7-DMN. The hydrocarbon phase analyzed 62% 2,6-DMN and 38% 2,7-DMN. Thus the weight ratio of 2,6-DMN to 2,7-DMN was 1:1 in the charge mixture and 1.6:1 in the hydrocarbon phase. The recovery was 97%.

*Example V*

The procedure was the same as in Example IV except that the charge material was 1 gram of 2,6-DMN and 4 grams of 2,7-DMN. The acid phase analyzed 11% 2,6-DMN and 89% 2,7-DMN. The hydrocarbon phase analyzed 36% 2,6-DMN and 64% 2,7-DMN. Thus the ratio of 2,6-DMN to 2,7-DMN was 0.25:1 in the charge mixture and 0.56:1 in the hydrocarbon phase. The recovery was 99%.

Example VI

The procedure was the same as in Example V except that the charge material was 4 grams of 2,6-DMN and 1 gram of 2,7-DMN. The acid phase analyzed 50% 2,6-DMN and 50% 2,7-DMN. The hydrocarbon phase analyzed 88% 2,6-DMN and 12% 2,7-DMN. Thus the ratio of 2,6-DMN to 2,7-DMN was 4:1 in the charge mixture and 7.3:1 in the hydrocarbon phase. The recovery was 85%.

Example VII

The procedure was the same as in Example I except that the charge mixture was a DMN concentrate containing other DMN isomers in addition to the 2,6- and 2,7-isomers. The analysis of the charge mixture, hydrocarbon phase, and the acid phase was as follows:

|  | Feed, percent | Hydrocarbon Phase, percent | Acid Phase, percent |
|---|---|---|---|
| 2,6-DMN | 10.5 | 17.2 | 9.3 |
| 2,7-DMN | 11.5 | 6.6 | 18.1 |
| 1,6-DMN | 14.8 | 17.4 | 17.4 |
| 1,7-DMN | 8.6 | 11.6 | 6.0 |
| 1,3-DMN | 15.6 |  | 36.5 |
| 1,2-DMN | 4.8 | 8.1 | 1.7 |
| 2,3-, 1,4-, 1,5-DMN | 14.4 | 15.7 | 5.1 |
| 1-Ethylnaphthalene | 1.9 | 2.7 |  |
| 2-Ethylnaphthalene | 4.8 | 13.4 |  |
| Methylnaphthalenes | 4.1 | 6.7 |  |
| Others | 9.0 | 0.6 | 5.9 |

It can be calculated from these data that the weight concentration of 2,6-DMN in the hydrocarbon phase is 64% higher than in the charge mixture.

Example VIII

The acid phase from a separation carried out in the same manner as in the previous examples was charged to a stainless steel reactor tube filled with stainless steel packing, equipped with a heating supply and a condenser, and maintained at 100° C. An instantaneous decomposition of the complex occurred. The liquid which collected at the bottom of the reactor analyzed essentially pure DMN.

I claim:

1. Method comprising the steps of contacting a mixture of dimethylnaphthalene isomers, said mixture being dissolved in an inert solvent and two of said isomers being the 2,6-isomer and the 2,7-isomer, with HF and BF$_3$, said contacting being at a temperature in the range of −10° C. to 50° C., the molar ratio of HF to total dimethylnaphthalenes in said mixture being higher than 1:1, and the molar ratio of BF$_3$ to total dimethylnaphthalenes in said mixture being less than 1:1; and separating an acid phase from a hydrocarbon phase, whereby a concentrate of 2,6-dimethylnaphthalene is obtained.

2. Method of claim 1 in which said temperature is in the range of 0° to 35° C.

3. Method of claim 1 in which said molar ratio of HF to total dimethylnaphthalenes in said mixture is in the range of 5:1 to 75:1.

4. Method of claim 1 in which said molar ratio of BF$_3$ to total dimethylnaphthalenes in said mixture is in the range of 0.05:1 to 0.7:1.

5. Method of claim 1 in which said solvent is benzene.

6. Method comprising the steps of contacting an essentially binary mixture of 2,6-dimethylnaphthalene and 2,7-dimethylnaphthalene, said mixture being dissolved in an inert solvent, with HF and BF$_3$, said contacting being at a temperature in the range of −10° C. to 50° C., the molar ratio of HF to total dimethylnaphthalenes in said mixture being higher than 1:1, and the molar ratio of BF$_3$ to total dimethylnaphthalenes in said mixture being less than 1:1; and separating an acid phase from a hydrocarbon phase, whereby a concentrate of 2,6-dimethylnaphthalene is obtained.

7. Method of claim 6 in which said temperature is in the range of 0° to 35° C.

8. Method of claim 6 in which said molar ratio of HF to total dimethylnaphthalenes in said mixture is in the range of 5:1 to 75:1.

9. Method of claim 6 in which said molar ratio of BF$_3$ to total dimethylnaphthalenes in said mixture is in the range of 0.05:1 to 0.7:1.

10. Method of claim 6 in which said solvent is benzene.

References Cited in the file of this patent

UNITED STATES PATENTS

| 2,753,386 | McCaulay et al. | July 3, 1956 |
| 2,780,659 | McCaulay et al. | Feb. 5, 1957 |
| 2,819,324 | McCauley et al. | Jan. 7, 1958 |
| 3,023,255 | Lang et al. | Feb. 27, 1962 |